United States Patent
Neumann et al.

(10) Patent No.: US 6,305,351 B1
(45) Date of Patent: Oct. 23, 2001

(54) ENGINE CONTROL UNIT FOR GASEOUS INJECTION ENGINE

(75) Inventors: Barry R. Neumann; William K. Wright; Daniel Nelson, all of Herdsman (AU)

(73) Assignees: Orix Vehicle Technology Pty Ltd, Double Bay; Transcom NGVS Research Pty Ltd, Herdsman, both of (AU)

(*) Notice: Subject to any disclaimer, the term of this patent is extended or adjusted under 35 U.S.C. 154(b) by 0 days.

(21) Appl. No.: 09/269,791
(22) PCT Filed: Oct. 1, 1997
(86) PCT No.: PCT/AU97/00658
  § 371 Date: Apr. 27, 2000
  § 102(e) Date: Apr. 27, 2000
(87) PCT Pub. No.: WO98/14696
  PCT Pub. Date: Apr. 9, 1998

(30) Foreign Application Priority Data

Oct. 1, 1996 (AU) .................................................. PO2717

(51) Int. Cl.⁷ ................................ F02D 9/02; F02D 19/02
(52) U.S. Cl. ...................... 123/399; 123/352; 123/436; 123/486
(58) Field of Search .......................... 123/350, 352–355, 123/361, 399, 436, 478, 480, 486, 527

(56) References Cited

U.S. PATENT DOCUMENTS

| | | | |
|---|---|---|---|
| 4,524,745 | 6/1985 | Tominari et al. | 123/478 |
| 4,625,690 | 12/1986 | Morita | 123/350 |
| 4,799,467 | 1/1989 | Ishikawa et al. | 123/399 |
| 4,811,713 * | 3/1989 | Shimada et al. | 123/399 |
| 4,953,530 * | 9/1990 | Manaka et al. | 123/399 |
| 4,971,011 * | 11/1990 | Nanyoshi et al. | 123/350 |
| 5,520,146 | 5/1996 | Hrovat et al. | 123/336 |
| 5,526,787 * | 6/1996 | Pallett | 123/399 |
| 5,598,825 * | 2/1997 | Neumann | 123/478 |
| 5,806,488 * | 9/1998 | Imberg | 123/478 X |
| 6,116,216 * | 9/2000 | Wright et al. | 123/399 |

FOREIGN PATENT DOCUMENTS

| | | |
|---|---|---|
| 0 659 991 A2 | 6/1995 | (EP). |
| 08144820 | 6/1996 | (JP). |
| 08165947 | 6/1996 | (JP). |

* cited by examiner

Primary Examiner—Tony M. Argenbright
(74) Attorney, Agent, or Firm—Nixon & Vanderhye

(57) ABSTRACT

An engine control unit and method of controlling the operation of a gas fuelled internal combustion engine of the kind having a gas injector for injecting gaseous fuel into each cylinder and an inlet manifold through which air flows into each cylinder of the engine, the inlet manifold having a manifold valve to control the flow of air into the inlet manifold. An improved control strategy employed by the engine control unit involves closed loop control of airflow through the inlet manifold of the engine. Manifold absolute pressure (MAP) (70) and manifold air temperature (MAT) (72) are employed to calculate air density (84) which is representative of the mass of air flowing through the inlet manifold (28). The detected air density (84) is compared to a desired air density (DAD) (86) and an air density correction (88) is calculated to adjust the manifold valve position (MVP) (90).

15 Claims, 3 Drawing Sheets

ENGINE CONTROL UNIT FOR GASEOUS INJECTION ENGINE

FIELD OF THE INVENTION

The present invention relates to an engine control unit (ECU) and relates particularly to an engine control unit for a gas fuelled internal combustion engine.

BACKGROUND TO THE INVENTION

Commonly owned international application No. PCT/AU93/00649 (WO 94/13946) discloses an engine control unit (ECU) in which each of the following engine operating parameters are detected: engine speed, throttle position, manifold absolute pressure (MAP), gas pressure, gas temperature, battery voltage, manifold air temperature, engine phase and boost pressure control valve (BPCV) feedback position. Each of these parameters is provided as an input in the form of an electrical signal to the ECU controller, for controlling the operation of a gas fuelled internal combustion engine. The ECU controller typically employs the detected engine speed and throttle position to calculate a percentage full load (PFL) value for the engine. PFL is a non-dimensional measure of the load or torque produced by or required from the engine. The calculated PFL value can then be employed by the ECU controller to calculate the injector ON time (IOT) for each gas injector in a gas delivery system for the engine. Typically, the PFL value is employed together with the engine speed to calculate a required manifold absolute pressure (MAP) value. The calculated value of required MAP may then be employed, together with the PFL value, to calculate a percent allowable load (PAL) value. The PAL value is then employed by the ECU controller to calculate the IOT and spark advance for the engine. By employing gas injectors and accurately calculating the IOT, the ECU can control the correct amount of gaseous fuel to be injected into each cylinder to achieve optimum engine performance under the full range of engine speed and load conditions. The disclosure of WO 94/13946 is incorporated herein by reference.

The ECU of WO 94/13946 operates very satisfactorily and is still in use in some gas fuel vehicles. However, certain improvements to the ECU were perceived as desirable to provide better control over the delivery of air and gas to each cylinder of the engine. Compliance with the stringent exhaust emission standards now being introduced in many countries, which aim to reduce the level of $NO_x$ gases, carbon monoxide and hydrocarbons in engine exhaust fumes was also a factor. It was thought desirable to be able to provide a greater degree of control over the air:fuel ratio in each cylinder of the engine so that the engine can operate as lean as possible (to reduce $NO_x$) without causing engine misfire to occur.

SUMMARY OF THE INVENTION

The present invention was developed with a view to providing an engine control unit capable of providing an improved level of control over the delivery of air and gaseous fuel to each cylinder of the engine in order to achieve optimum engine performance.

According to one aspect of the present invention there is provided a method of controlling the operation of a gas fuelled internal combustion engine, the engine having a gas injector for injecting gaseous fuel into each cylinder and an inlet manifold through which air flows into each cylinder of the engine, the inlet manifold having a manifold valve to control the flow of air into the inlet manifold, the method comprising the steps of:

detecting the current throttle position of the engine;
  detecting a manifold air parameter representative of the mass of air flowing through the inlet manifold;
  deriving a desired load value for the engine, based on said current throttle position; and,
  calculating a manifold valve position based on said desired load value and manifold air parameter, wherein the correct amount of air is delivered to the engine cylinders responsive to current throttle position to achieve optimum engine performance.

Preferably the method further comprises detecting the current engine speed of the engine and employing the current engine speed in said step of deriving the desired load value.

Advantageously the method further comprises deriving a desired manifold air parameter and comparing it with the value of the detected manifold air parameter to obtain a manifold air parameter correction value, and employing said manifold air parameter correction value in said step of calculating the manifold valve position.

In a preferred embodiment said detected manifold air parameter is air density (AD) which is calculated from a detected manifold absolute pressure (MAP) and a detected manifold air temperature (MAT), said desired manifold air parameter is desired air density (DAD), and said manifold air parameter correction value is an air density error corresponding to the difference between the desired and detected air density.

Preferably the method further comprises deriving an allowed load value based on said desired load value reduced by the ratio of said detected manifold air parameter to desired manifold air parameter, and deriving an injector ON time for each cylinder based on said allowed load value.

Advantageously said step of deriving an injector on time (IOT) comprises calculating a base IOT and an individual injector offset for each cylinder of the engine wherein variances between cylinders due to dynamic air flow and resonance effects in the manifold can be taken into account to balance the cylinders of the engine. Preferably the individual IOT for each injector is also compensated for variations in gas pressure and gas temperature. Preferably the individual IOT for each injector is also compensated for variations in flow rate for each injector.

According to another aspect of the present invention there is provided an engine control unit for controlling the operation of a gas fuelled internal combustion engine, the engine having a gas injector for injecting gaseous fuel into each cylinder and an intake manifold through which air flows into each cylinder of the engine, a manifold valve being provided to control the flow of air into the intake manifold, the control unit comprising:

throttle position detecting means for detecting the current is throttle position of the engine;
  manifold air detecting means for detecting a manifold air parameter representative of the mass of air flowing through the intake manifold; and,
  processing means for deriving a desired load value for the engine based on said current throttle position, and for calculating a manifold valve position based on said desired load value and manifold air parameter, wherein the correct amount of air is delivered to the engine cylinders responsive to current throttle position to achieve optimum engine performance.

BRIEF DESCRIPTION OF THE DRAWINGS

In order to enable the nature of the invention to be more clearly ascertained a preferred embodiment of the improved engine control unit and method of control will now be described in detail by way of example only, with reference to the accompanying drawings in which.

DETAILED DESCRIPTION OF PREFERRED EMBODIMENT

Figure 1:
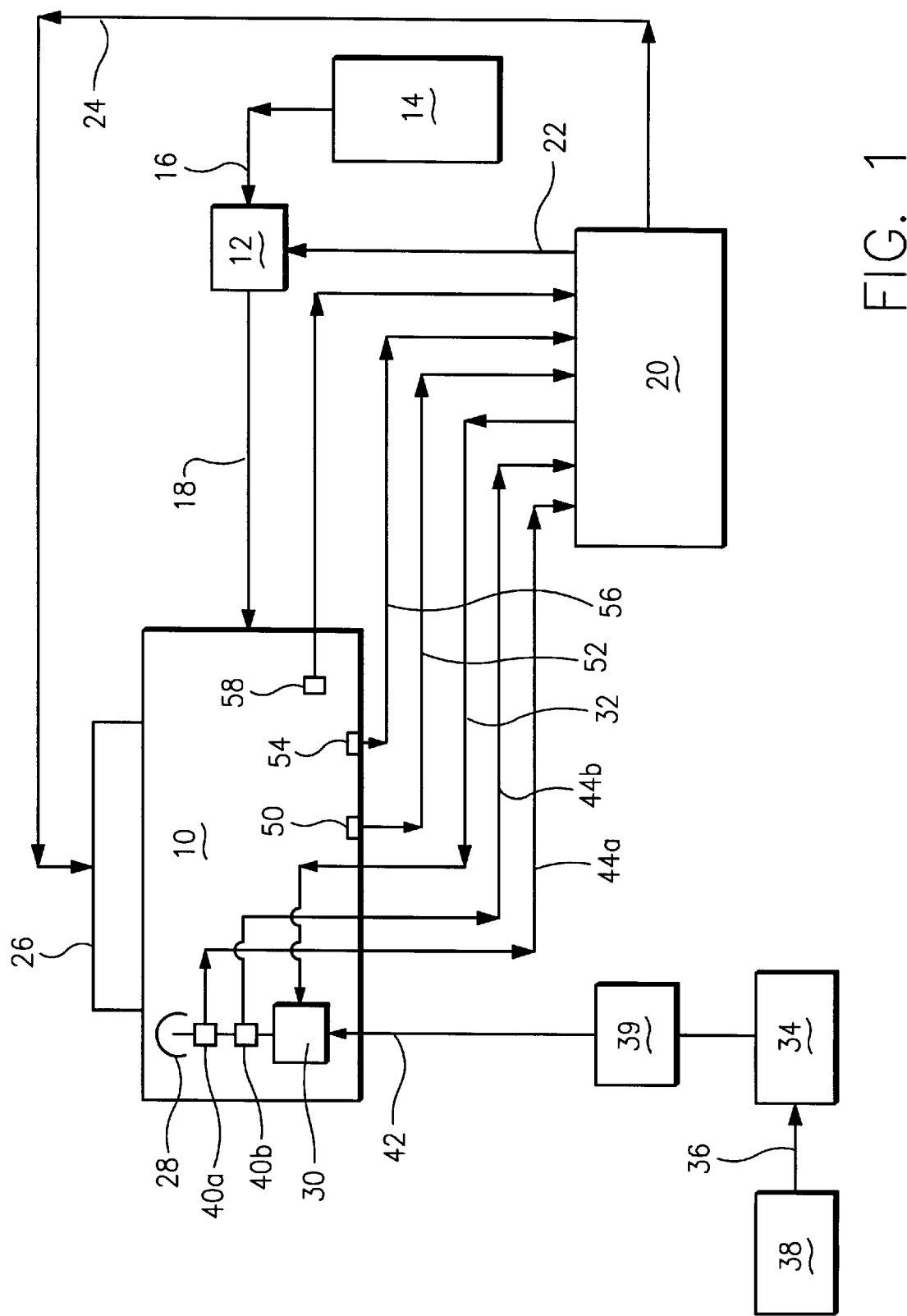
FIG. 1 is a functional block diagram of a gas fuelled internal combustion engine to which an embodiment of the ECU of the present invention is applied.

Referring to FIG. 1, a spark ignited internal combustion engine is illustrated diagrammatically at 10. The engine 10 is capable of operating on a gaseous fuel, and is provided with a gas delivery system 12 for controlling the delivery of gaseous fuel from a gas reservoir 14, via a gas delivery line 16 to a fuel inlet 18 of the engine. The gas delivery system 12 provides sequential multipoint injection via individual solenoid operated gas injectors (not illustrated) for each cylinder of the engine. Gas delivery system 12 is under the control of an Engine Control Unit controller 20 via control line 22. The gas injectors of the gas delivery system 12 inject gas sequentially to the engine, each injector delivering gas during the intake stroke of it's respective cylinder. The Engine Control Unit (ECU) controller 20 delivers a signal via ignition control line 24 to a spark ignition system 26, which causes the fuel introduced into the engine, along with air, to be ignited and hence provide the power stroke of each cylinder.

Air to support combustion is delivered to the engine 10 through air inlet 28, for example, the inlet manifold of the engine, via air throttle means 30. Air throttle means 30 may comprise, for example, a manifold valve which is also under the control of the ECU controller 20 via manifold valve control line 32, for controlling the flow of air into the inlet manifold of the engine.

Air is delivered to inlet 28 via the manifold valve 30 from a turbocharger 34. Air at ambient pressure is supplied to the turbocharger 34 through an air delivery line 36 from an air filter 38, which is open to atmosphere. Turbocharger 34 boosts the pressure of air delivered to the engine 10 via an intercooler 39, above an ambient pressure. Sensor 40a senses the air temperature in the boost air delivery line 42 and provides a feedback signal indicative of the inlet manifold air temperature (MAT) to the ECU controller 20 via control line 44a. Sensor 40b senses the actual manifold air pressure (MAP) and provides a feedback signal indicative of the MAP to the ECU controller 20 via control line 44b.

In this embodiment, the primary inputs to the ECU controller 20 are engine speed and throttle position. Engine speed is detected by a sensor 50 which generates a signal indicative of the engine speed on input line 52 to the ECU controller 20. Sensor 50 is typically an inductive (magnet and coil) sensor positioned adjacent to the ring gear teeth of the fly wheel of the engine 10, The sensor produces a sinusoidal wave form (FWT) having voltage and frequency characteristics that vary with the engine speed. The actual engine spaced is calculated by ECU controller 20 by measuring the time between a fixed number of peaks and troughs in the wave form.

Throttle position is measured by a throttle position sensor 54 which provides an electrical signal indicative of the throttle position on input line 56 to the ECU controller 20. The throttle position sensor 54 in this embodiment comprises a potentiometer "geometrically" coupled to the throttle/accelerator pedal linkage. Typically, 0.0 Volts equates to zero position, whilst 5.0 Volts equates to maximum throttle position.

In the illustrated embodiment the engine 10 is a six cylinder engine provided with six ignition coils (one coil per cylinder.) A timing pulse is generated by a timing or engine phase sensor 58, mounted on the engine, every second revolution of the engine. Fly wheel teeth signals from the engine speed sensor 50 are modified by a phase locked loop circuit which multiplies the signal frequency by nine (XFWT). Nine is chosen as the multiple so that XFWT gives eighteen zero voltage crossings. In this way two revolutions of the six cylinder engine can always be divided up into six intervals of equal angular displacement. Since the actual physical location of the timing sensor 58 is known, it is possible to nominate ignition timings in the standard units of ° Crank Angle Before Top Dead Centre. In this embodiment the ECU controller 20 also uses the $\frac{1}{18}$ of a flywheel tooth interval XFWT (approximately 0.13°) as the increment by which spark angle advance (SAA) may be varied.

The ECU controller 20 typically comprises a microprocessor based control system, having analogue to digital converters (ADC) for converting the analogue signals from sensors 40a, 40b, 50 and 54 into a digital format. Digital signals are employed to provide suitable control signals for controlling the position of manifold valve 30, and the operation of the gas delivery system 12 and spark ignition system 26. ECU controller 20 also comprises suitable non-volatile memory devices for storing look-up tables of engine operating parameters, employed by the ECU controller 20 to achieve optimum engine performance. The programmable nature of the ECU controller 20 means that it can be readily modified to suit different engines, and provides complete freedom in setting engine performance characteristics. As the engine is fully under the control of the Engine Control Unit responsive to engine speed and throttle position as set by the driver (assuming the engine is a vehicle engine), the vehicle can effectively be under "drive-by-wire" control.

The engine management system as described above is similar to that described in WO 94/13946, except that a boost pressure control valve is no longer employed for controlling the boost pressure of air delivered to the engine 10. The principal improvements are to be found in the method of controlling the operation of the gas fuelled internal combustion engine 10, employing the improved ECU.

The improved ECT is also of reduced size in order to facilitate engine mounting of the unit. Size reduction is achieved in several ways. The ECU is controlled with a single Motorola 68332 processor to replace the three 88196 processors found in the earlier model, interfaced to 128k bytes of static RAM and 128k bytes of flash RAM. All analog sensor signals are conditioned and input to a pair of multiplexing A/D converters. The multiplexing A/D converters multiplex the signals to a 12 bit serial A/D converter. The processor selects a signal through the multiplexing A/D converters and reads the serial A/D data. The following table summarizes the sensors which provide either digital or analog inputs to the processor respectively:

| Sensor | Type | Range | Output |
|---|---|---|---|
| Engine Phase | Hall Effect | 1 per 2 revs | TTL |
| Fly Wheel Teeth | Inductive | 100–5000 rpm | 0–+/−6 V |
| Trans. in gear | Digital | On/Off | 24 V |
| Throttle Position | Potentiometer | 0–100% | 0–5 V |
| MAP | Strain Gauge | 0–30 psia | 0–90 mV |
| Gas Pressure | Strain Gauge | 0–300 psig | 0–60 mV |
| MAT | NTC Thermistor | −40° + 125° C. | 0–5 V |
| Gas Temp | NTC Thermistor | −40° + 125° C. | 0–5 V |
| Water Temp | NTC Thermistor | −40° + 125° C. | 0–5 V |
| Exhaust Temp | K Thermocouple | 0° to 800° C. | 0–40 mV |
| ECU Temp | Semiconductor | 0° to +125° C. | 0–5 V |
| Supply Voltage | Resistor Divider | 0–30 V | 0–5 V |

A preferred method of controlling the operation of a gas fuelled internal combustion engine in accordance with the present invention will now be described in detail with reference to FIG. 3.

Figure 2:
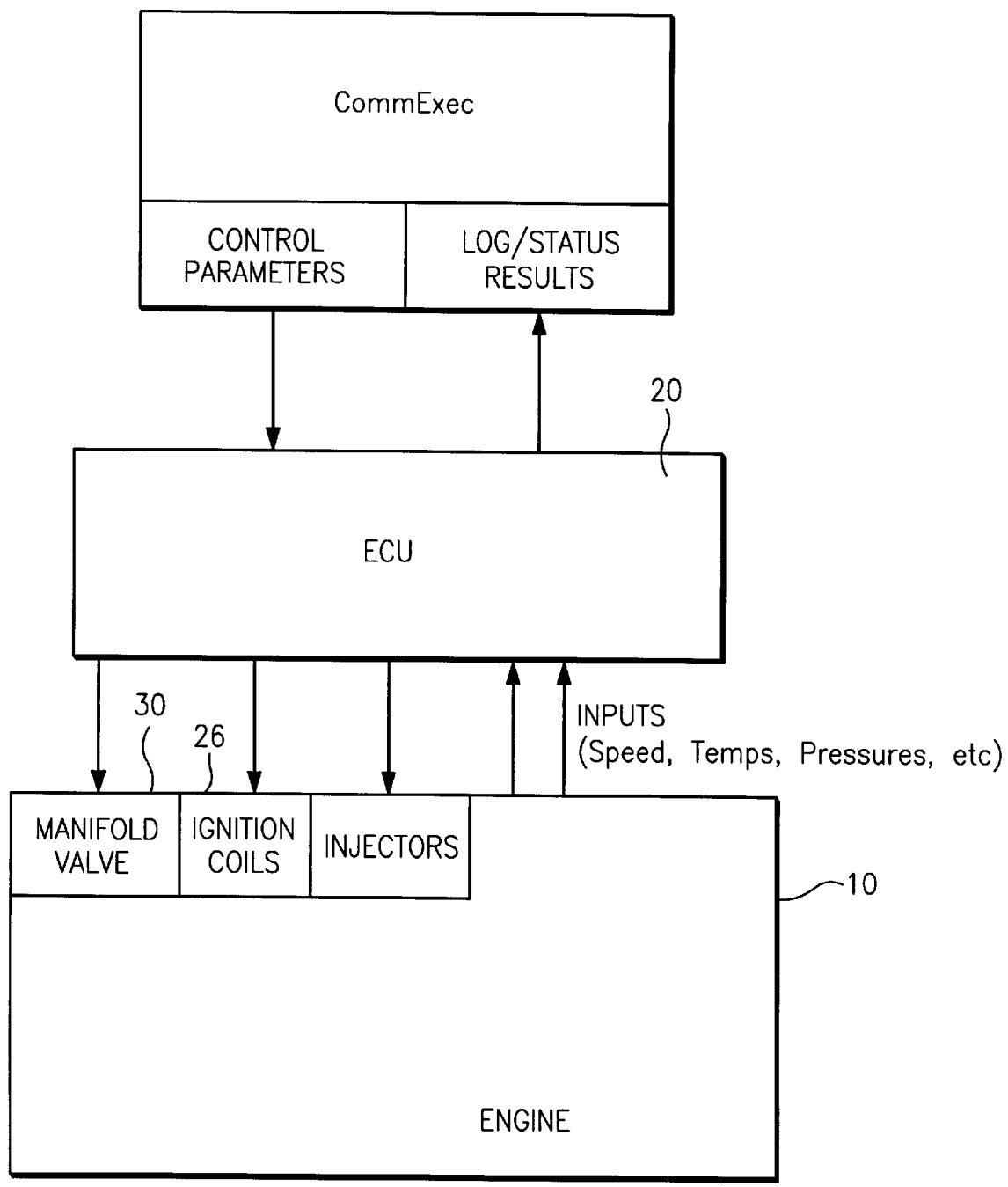
FIG. 2 is a block diagram illustrating the inter-relationship between the ECU, the CommExec software and the engine; and, FIG. 3 is an overall system flow chart which depicts the operation of the ECU as a function of various engine operating parameters.

The ECU uses various engine operating parameters stored in non-volatile memory to control the operation of the engine. These parameters may be programmed through the serial port by an external device. A software package has been developed, called CommExec, for commissioning the ECU and performing various executive functions. The engine operating parameters are collectively known as the engine control set (ECS). The ECS includes numerous parameters defined and stored in table form, including the Engine Speed Table, Startup Spark Advance Angle Table, Startup Injector On Time Table, Water Jacket Temperature Throttle Limit Table, Manifold Air Temperature Throttle Limit Table, Exhaust Temperature Throttle Limit Table, Individual Injector Switch On Time Table, Individual Injector Flow Rate Table and the MVP Area Table, most of which are self-explanatory. These parameters are stored in the ECU memory during commissioning of the ECU following engine mapping. The CommExec software is used to program the ECS during commissioning, and may also read the ECS that the ECU is currently using. CommExec may also request operational logging for monitoring of engine performance. The CommExec software communicates with the ECU via a three wire RS-232 serial interface. FIG. 2 illustrates in block diagram form an overview of the interrelationship between CommExec, the ECU and the engine.

Once an engine has been fully commissioned and run in, it is mapped at a combination of speeds and loads to build up the full ECS that gives the engine its required performance. This covers steady state torque output, maximum speed governing and emissions, whilst observing the original equipment manufacturer's (OEM's) limits on thermal loads and maximum cylinder pressure. During this process the ECU automatically compensates for gas pressure and temperature variations that inevitably occur such that the injector on-time (IOT) to be recorded is referenced to standard gas pressure and temperature. Similarly, ignition timing is modified according to the manifold air temperature such that the recorded values are augmented if the air temperature is higher than the set reference temperature of 25° C. and conversely if the air temperature is lower than the reference. When mapping is finished all engine operating parameters are downloaded into the ECU.

The software in this embodiment of the improved ECU supports five types of 3-D tables;
Manifold (butterfly) Valve Position
This 3-D table is used to specify the manifold valve position (in absolute steps) depending on the Engine Speed and Allowed Load. It consists of an array of manifold valve positions corresponding in one dimension to the speeds in the Engine Speed table, and in the other dimension to Desired Load indices.
Desired Air Density (ie. within the inlet manifold)
This 3-D table is used to derive the Desired Air Density (in $g/m^3$) from the Desired Load and Engine Speed. It consists of an array of air density values corresponding in one dimension to the speeds in the Engine Speed table, and in the other dimension to Desired Load indices.
Base Injector On Time
This 3-D table is used to specify the Base Injector On Time (IOT) (in timing units) depending on the Engine Speed and Allowed Load. It consists of an array of Base IOTS corresponding in one dimension to the speeds in the Engine Speed table, and in the other dimension to Allowed Load indices.
Injector On Time Offset×6 (ie. one per cylinder)
This 3-D table contains the individual IOT offset (in timing units) for each of the injectors, depending on Engine Speed and Allowed Load.
Ignition Timing
This 3-D table is used to specify the Spark Advance Angle (SAA) (in degrees rotation, which is converted to XFWT) depending on the Engine Spaced and Allowed Load. It consists of an array of Spark Advance Angles corresponding in one dimension to the speeds in the Engine Speed table, and in the other dimension to Allowed Load indices.

These 3-D tables are stored as look-up tables within the non-volatile memory devices of ECU controller 20, and are similar to the 3-D look-up tables illustrated in FIGS. 4 to 7 of WO 94/13946.

Figure 3:
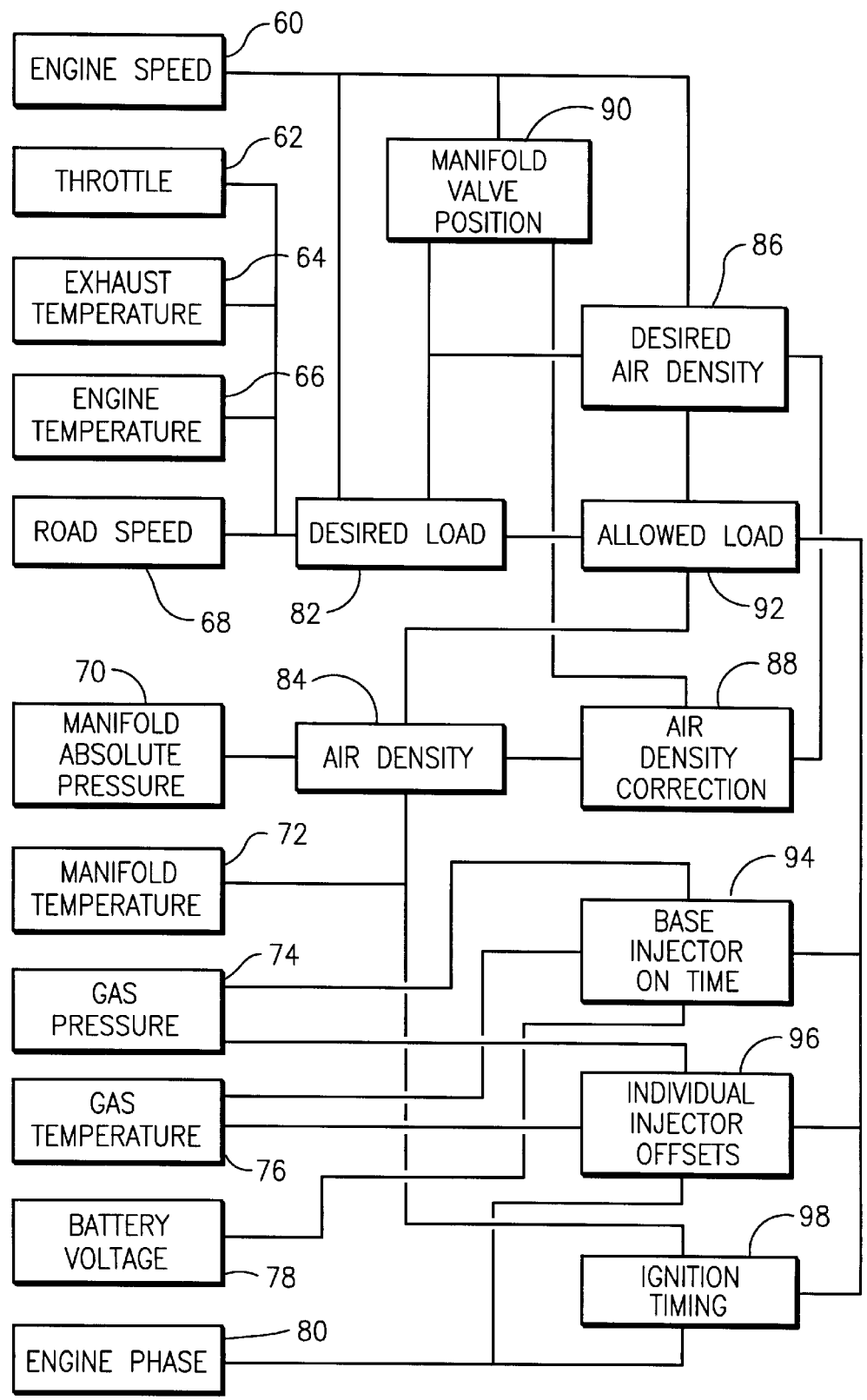

On the left hand side of the flow chart of FIG. 3 each of the engine operating parameters employed in this embodiment of the engine control unit are listed, namely, engine speed 60, throttle position 62, exhaust temperature 64, engine temperature 66, road speed 68, manifold absolute pressure (MAP) 70, manifold air temperature (MAT) 72, gas pressure 74, gas temperature 76, battery voltage 78 and engine phase 80. Each of these parameters is provided as an input in the form of an electrical signal to the ECU controller 20 of FIG. 1, for controlling the operation of the gas fuelled internal combustion engine 10. ECU controller 20 typically employs the detected engine speed 60 and throttle position 62 to calculate a desired load (DL) value for the engine. DL is a non-dimensional measure of the load or torque produced by or required from the engine. It is generally directly proportional to throttle position, except in the governing regions of the load/speed envelope, where speed is controlled.

When the engine is not in an idle state, the Desired Load is derived by reading the detected current throttle position. Exhaust, air and engine temperature inputs are used to reduce Desired Load independent of throttle if these variables exceed preset values (as specified in the Water Jacket Temperature Throttle Limit Table, MAT Throttle Limit Table, Exhaust Throttle Limit Table), and applying load governing if required. Engine temperature 66 is also used to vary idle speed such that the engine speed is increased at high and low temperatures to aid in engine cooling and warm-up respectively.

In this embodiment of the ECU, load governing occurs in two forms, namely, high speed load governing and variable speed load governing. High speed load governing is selected when variable speed governing is disabled or automatic transmission is selected and the transmission is in gear. If selected then the desired load must be less than the high speed governing line which falls from a maximum at Max Power Speed to zero at Max Govern Speed. Thus, if engine speed is greater than Max Govern Speed, Desired Load becomes zero, whereas if engine speed is less than Max Power Speed, or Desired Load is less than the governing line, then desired load is unchanged.

Variable speed load governing is selected when variable speed governing is enabled; and manual transmission is selected, or automatic transmission is selected and in neutral. In this form of load governing, the desired load is set equal to the variable speed governing line which falls to zero at a variable speed dependent on throttle. The slope of the line is determined by the Max Power and Max Govern speeds, whereas the position of the line along the speed axis is determined by the throttle.

A significant improvement in the control strategy employed by the ECU is the closed loop control of air flow through the inlet manifold 28 of the engine. A manifold air parameter representative of the mass of air flowing through the inlet manifold is detected and compared with a desired manifold air parameter for the Desired Load and Engine Speed, as found in a look-up table. In this embodiment, manifold absolute pressure (MAP) 70 and manifold air temperature (MAT) 72 are employed to calculate Air Density 84, which is representative of the mass of air flowing through the inlet manifold. Comparison of the MAP and the exhaust back pressure may also be used to obtain a more accurate measure of the mass of air flowing through the inlet manifold. The detected Air Density is compared to the Desired Air Density (DAD) 86 in the 3-D DAD Table and an air density correction 88 is calculated to adjust the Manifold Valve Position (MVP) 90.

The ECU controller 20 uses a proportional integral derivative (PID) algorithm to adjust the MVP 90 to attempt to keep the manifold air density at a desired value. This adjustment is performed every control loop. In driving the air density correction 88 two error values are calculated, namely, air density error (difference between desired and measured air density), and delta Air Density error (difference between current and previous air density error). The error values have signs such that a detected air density which is lower than the DAD causes the manifold valve to be adjusted more open, whereas an increasing detected air density causes the manifold valve to be adjusted less open. These errors are scaled by user programmable factors, and then summed and accumulated to give an adjustment in the manifold valve area. The accumulator is scaled so that small adjustments are not lost. The accumulated adjustment is limited to a percentage of the current manifold valve area, ie, if the limit is 50% then the manifold area may only be adjusted by up to 50% of its current value. Manifold area is scaled so that 10,000 represents fully open. The current manifold valve position (MVP) is converted to open area using the MV-Area Table, the adjustment is applied to the area, and the new area is converted back to a new MVP. Advantageously the manifold valve actuator is also provided with its own on-board controller as described in co-pending patent application No. PO 2716, corresponding to U.S. Pat. No. 6,116,216, which receives the new MVP from the ECU and moves the valve accordingly.

The Desired Load 82 and Desired Air Density 86 are used to derive an Allowed Load (AL) value 92. Allowed Load is derived either from the Desired Load, or the Desired Air Density (DAD) 86, detected Air Density 84 and Desired Load 82. DAD is derived from the 3-D DAD Table indexed by Engine Speed and Desired Load. If the detected Air Density is greater than DAD then Allowed Load is set equal to Desired Load, otherwise Allowed Load is derived as follows:

$$\text{Allowed Load} = \text{Desired Load} \times \frac{\text{Air Density} - \text{Offset}}{\text{Desired Air Density} - \text{Offset} - \text{Transient Factor}}$$

The Transient Factor is used to bring Allowed Load closer towards Desired Load when the Engine Speed and/or load is increasing, and is designed to improve the acceleration of the engine. The increase in Engine Speed and Desired Load are multiplied by constants and both are added to give a single loop Transient Factor. Transient Factor has units of $g/m^3$ and is currently limited to values of 80 to 180.

As can be seen in FIG. 3, once the Allowed Load 92 has been determined the ECU controller 20 can proceed with calculation of the gas injector and ignition timing. The ECU performs two types of Injector On Time (IOT) calculations. Firstly, a base IOT (94) is calculated which is common to all injectors (cylinders) of the engine. During normal engine operation, the base IOT is interpolated from the base IOT 3-D Table based on current engine speed and the calculated Allowed Load value. A base IOT offset specified by CommExec is then added to the base IOT, limited to ensure no under or over flow occurs. Secondly, the ECU makes individual IOT calculations for each injector (cylinder) of the engine. Individual injector IOT offsets (96) are derived from the IOT Offset 3-D table for each of the injectors, based on current Engine Speed and calculated Allowed Load value. The individual IOT Offset 96 is added to the Base IOT 94 and various compensations are applied. Gas compensation is performed in several stages, namely, gas pressure compensation and gas temperature compensations, each of which may be turned on or off. Injector flow rate compensation may also be applied to the individual IOT values. The injector switch-on time is determined for each injector (compensated for battery voltage 78 if enabled) and added to the individual IOT. The delay from Timing Mark until injector switch-on is then determined from the calculated IOT, timing mark advance angle (fixed by design), base injection centre point (ICP), ICP speed offset table and the Engine Speed.

The individual injector offsets may also be modified on the basis of a combustion related parameter, such as the exhaust temperature measured at the exhaust port of each cylinder. It is known that, particularly for gas engines, the lower the temperature of the exhaust, the leaner the mixture and the better the engine performance. At any particular engine speed and load, if measurements of exhaust temperature are taken at each cylinder, there will typically be a range of temperatures. The cylinders with the lowest temperature are those operating with the leanest fuel mixture and therefore most efficiently. Due to limitations in the design of air intake manifolds, it is essentially impossible to deliver the same amount of air to each cylinder to produce identical air fuel mixtures. Therefore, an alternative to controlling the amount of air provided to each cylinder is to control the amount of fuel injected. During mapping of the engine characteristics, a record of a combustion related parameter, such as the exhaust temperature, for each cylinder under the full range of engine load and speed combinations is obtained.

Hence, the ECU can adjust the operation of individual fuel injectors to vary the air fuel mixture so that the temperatures of the exhaust gases from each of the cylinders can be balanced.

The provision of individual injector offsets means that variances between cylinders due to dynamic air flow and resonance affects in the manifold as well as variances in the individual injectors can be compensated for. Each injector can be given either a positive or negative offset value to balance the cylinders of the engine. This feature allows the engine to operate as lean as possible to reduce $NO_x$ emissions without incurring misfire limitations that would otherwise occur.

The ECU also performs ignition control 98 which involves calculation of the spark advance angle (SAA), offset and compensation of SAA, coil on time (COT) determination and ignition timing. Ignition control in the improved ECU of the present invention is similar to that described in WO 94/13949 (Electronic Engine Timing), except that the flywheel teeth signal (XFWT) is only multiplied by nine (9) to give greater resolution and stability of the PLL than before. Spark advance or ignition timing can also be retarded if the air density (AD) is less than the desired air density (DAD) and conversely if the AD is greater than the DAD as may occur during transients.

Now that the design and operation of a preferred embodiment of the improved engine control unit according to the invention have been described in detail, it will be apparent that the system has significant advantages over the previous ECU for controlling the operation of gas fuelled internal combustion engines. In particular, by monitoring a manifold air parameter and comparing this with a desired manifold air parameter, closed loop control of the manifold valve position can be effected to achieve optimum engine performance under the full range of engine speed and load conditions. Furthermore, compliance with stringent exhaust emission standards is facilitated because of the greater degree of control over the air:fuel ratio in each cylinder of the engine. In addition, the provision of individual injector IOT offsets enables the effects of variances between cylinders due to inlet manifold and injector characteristics to be compensated for, to balance the cylinders of the engine within a lean burn regime.

Numerous variations and modifications will suggest themselves to persons skilled in the electronic and mechanical engineering arts, in addition to those already described, without departing from the basic inventive concepts. For example, an air flow sensor may be employed to provide a direct measurement of the mass of air flowing into the engine. All such variations and modifications are to be considered within the scope of the present invention, the nature of which is to be determined from the foregoing description and the appended claims.

The claims defining the invention are as follows:

1. A method of controlling the operation of a gas fuelled internal combustion engine, the engine having a gas injector for injecting gaseous fuel into each cylinder and an inlet manifold through which air flows into each cylinder of the engine, the inlet manifold having a manifold valve to control the flow of air into the inlet manifold, the method comprising the steps of:

detecting the current throttle position of the engine;
   detecting a manifold air parameter representative of the mass of air flowing through the inlet manifold;
   deriving a desired load value for the engine, based on said current throttle position; and,
   calculating a manifold valve position based on said desired load value and manifold air parameter, wherein the correct amount of air is delivered to the engine cylinders responsive to current throttle position to achieve optimum engine performance.

2. A method of controlling the operation of a gas fuelled internal combustion engine as defined in claim 1, wherein the method further comprises detecting the current engine speed of the engine and employing the current engine speed in said step of deriving the desired load value.

3. A method of controlling the operation of a gas fuelled internal combustion engine as defined in claim 1, wherein method further comprises deriving a desired manifold air parameter and comparing it with the value of the detected manifold air parameter to obtain a manifold air parameter correction value, and employing said manifold air parameter correction value in said step of calculating the manifold valve position.

4. A method of controlling the operation of a gas fuelled internal combustion engine as defined in claim 3, wherein said detected manifold air parameter is air density (AD) which is calculated from a detected manifold absolute pressure (MAP) and a detected manifold air temperature (MAT).

5. A method of controlling the operation of a gas fuelled internal combustion engine as defined in claim 4, wherein said desired manifold air parameter is desired air density (DAD), and said manifold air parameter correction value is an air density error corresponding to the difference between the desired and detected air density.

6. A method of controlling the operation of a gas fuelled internal combustion engine as defined in claim 3, wherein the method further comprises deriving an allowed load value based on said desired load value reduced by the ratio of said detected manifold air parameter to desired manifold air parameter, and deriving an injector ON time for each cylinder based on said allowed load value.

7. A method of controlling the operation of a gas fuelled internal combustion engine as defined in claim 6, wherein said step of deriving an injector on time (IOT) comprises calculating a base IOT and an individual injector offset for each cylinder of the engine wherein variances between cylinders due to dynamic air flow and resonance effects in the manifold can be taken into account to balance the cylinders of the engine.

8. A method of controlling the operation of a gas fuelled internal combustion engine as defined in claim 7, wherein the individual IOT for each injector is also compensated for variations in gas pressure and gas temperature.

9. A method of controlling the operation of a gas fuelled internal combustion engine as defined in claim 8, wherein the individual IOT for each injector is also compensated for variations in flow rate for each injector.

10. An engine control unit for controlling the operation of a gas fuelled internal combustion engine, the engine having a gas injector for injecting gaseous fuel into each cylinder and an intake manifold through which air flows into each cylinder of the engine, a manifold valve being provided to control the flow of air into the intake manifold, the control unit comprising:

throttle position detecting means for detecting the current throttle position of the engine;
   manifold air detecting means for detecting a manifold air parameter representative of the mass of air flowing through the intake manifold; and,
   processing means for deriving a desired load value for the engine based on said current throttle position, and for calculating a manifold valve position based on said desired load value and manifold air parameter, wherein the correct amount of air is delivered to the engine cylinders responsive to current throttle position to achieve optimum engine performance.

11. An engine control unit for controlling the operation of a gas fuelled internal combustion engine as defined in claim 10, further comprising means for detecting the current engine speed of the engine, said processing means also employing the current engine speed to derive the desired load value.

12. An engine control unit for controlling the operation of a gas fuelled internal combustion engine as defined in claim 11, wherein said manifold air detecting means includes a manifold air pressure sensor and a manifold air temperature sensor for sensing the manifold absolute pressure (MAP) and manifold air temperature (MAT) respectively.

13. An engine control unit for controlling the operation of a gas fuelled internal combustion engine as defined in claim 12, further comprising a non-volatile memory means in which selected look-up tables of selected engine operating parameters are stored, including manifold valve position (MVP) and a desired manifold air parameter indexed to engine speed and desired load value, for use by said processing means in calculating the manifold valve position.

14. An engine control unit for controlling the operation of a gas fuelled internal combustion engine as defined in claim 13, wherein said detected manifold air parameter is air density and wherein said manifold air detecting means includes means for calculating the air density based on the sensed MAP and MAT.

15. An engine control unit for controlling the operation of a gas fuelled internal combustion engine as defined in claim 14, wherein said desired manifold air parameter is desired air density, and wherein said processing means includes means for comparing the desired air density with the detected air density to obtain an air density error which is employed when calculating the manifold valve position.

* * * * *